United States Patent
Pihl

(10) Patent No.: US 12,422,554 B2
(45) Date of Patent: Sep. 23, 2025

(54) METHOD FOR DETERMINING COORDINATES OF A VEHICLE

(71) Applicant: Volvo Truck Corporation, Gothenburg (SE)

(72) Inventor: Jacob Pihl, Mölndal (SE)

(73) Assignee: Volvo Truck Corporation, Gothenburg (SE)

(*) Notice: Subject to any disclaimer, the term of this patent is extended or adjusted under 35 U.S.C. 154(b) by 1133 days.

(21) Appl. No.: 17/416,267

(22) PCT Filed: Dec. 18, 2018

(86) PCT No.: PCT/EP2018/085575
§ 371 (c)(1),
(2) Date: Jun. 18, 2021

(87) PCT Pub. No.: WO2020/125951
PCT Pub. Date: Jun. 25, 2020

(65) Prior Publication Data
US 2022/0057513 A1    Feb. 24, 2022

(51) Int. Cl.
*G01S 17/88* (2006.01)
*G01S 17/10* (2020.01)
(Continued)

(52) U.S. Cl.
CPC .............. *G01S 17/88* (2013.01); *G01S 17/10* (2013.01); *G05D 1/0217* (2013.01); *G05D 1/0236* (2013.01); *G05D 1/0274* (2013.01); *G06F 16/29* (2019.01); *G06K 19/06028* (2013.01); *G06V 10/22* (2022.01); *G06V 20/56* (2022.01)

(58) Field of Classification Search
CPC .......... G01S 17/88; G01S 17/10; G01S 17/08; G01S 17/46; G01S 17/48; G01S 17/931; G05D 1/0217; G05D 1/0236; G05D 1/0274; G06F 16/29; G06K 19/06028; G06K 7/10861; G06K 19/06018; G06V 10/22; G06V 20/56
See application file for complete search history.

(56) References Cited

U.S. PATENT DOCUMENTS

| 4,647,784 | A | 3/1987 | Stephens |
| 5,483,455 | A | 1/1996 | Lay et al. |

(Continued)

FOREIGN PATENT DOCUMENTS

| CH | 630855 A5 | 7/1982 |
| CN | 101241188 A | 8/2008 |

(Continued)

OTHER PUBLICATIONS

Machine Translation of CN103869283 (Year: 2014).*

(Continued)

*Primary Examiner* — Sahar Motazedi
(74) *Attorney, Agent, or Firm* — Withrow & Terranova, PLLC

(57) ABSTRACT

Method for determining coordinates of a vehicle (100), specifically using a sensor arrangement (202) arranged to acquire information in relation to an optical machine-readable tag (302) mounted in a surrounding of the vehicle (100). Furthermore, a location determining arrangement (200) and a corresponding computer program product.

15 Claims, 4 Drawing Sheets

(51) Int. Cl.
  *G05D 1/00* (2006.01)
  *G05D 1/02* (2020.01)
  *G06F 16/29* (2019.01)
  *G06K 19/06* (2006.01)
  *G06V 10/22* (2022.01)
  *G06V 20/56* (2022.01)

(56) References Cited

U.S. PATENT DOCUMENTS

| | | | |
|---|---|---|---|
| 2002/0198632 A1 | 12/2002 | Breed et al. | |
| 2003/0057270 A1 | 3/2003 | Collen | |
| 2006/0184013 A1* | 8/2006 | Emanuel | G01S 5/16 |
| | | | 600/426 |
| 2008/0040029 A1* | 2/2008 | Breed | G08G 1/161 |
| | | | 701/514 |
| 2012/0259465 A1 | 10/2012 | Chen et al. | |
| 2012/0323491 A1* | 12/2012 | Zhdanov | G01C 21/08 |
| | | | 701/530 |
| 2018/0180740 A1 | 6/2018 | Shaffer et al. | |
| 2018/0253105 A1 | 9/2018 | Suzuki et al. | |
| 2018/0356833 A1 | 12/2018 | Ohman | |
| 2019/0111842 A1* | 4/2019 | Batur | G06V 20/586 |

FOREIGN PATENT DOCUMENTS

| | | |
|---|---|---|
| CN | 101713999 A | 5/2010 |
| CN | 103869283 A | 6/2014 |
| CN | 106922195 A | 7/2017 |
| CN | 107976704 A | 5/2018 |
| DE | 19541379 A1 | 5/1997 |
| EP | 3385745 A1 | 10/2018 |
| JP | 2001142532 A | 5/2001 |
| JP | 2002189518 A | 7/2002 |
| JP | 2005063184 A | 3/2005 |
| JP | 2011170486 A | 9/2011 |
| KR | 20190063967 A | 6/2019 |
| WO | WO-2008057504 A2 * | 5/2008 ............ G08C 21/00 |
| WO | 2009098319 A2 | 8/2009 |
| WO | 2009098319 A3 | 8/2009 |
| WO | 2012068353 A2 | 5/2012 |
| WO | 2013175753 A1 | 11/2013 |

OTHER PUBLICATIONS

International Search Report and Written Opinion for International Patent Application No. PCT/EP2018/085575, mailed Sep. 3, 2019, 13 pages.

Gim, J. et al., "IMU-Based Virtual Road Profile Sensor for Vehicle Localization," Sensors, vol. 18, No. 10, Oct. 2018, MDPI, 16 pages.

Li, Z. et al., "INS/Odometer integrated navigation system based on position modification for underground mine vehicle," Journal of China Coal Society, vol. 38, No. 11, Nov. 2013, 7 pages.

Yan, X.-Z. et al., "Automatic guided vehicle system based on localization and navigation by ultrasonic and infrared ray," Journal of Jilin University (Engineering and Technology Edition), vol. 36, No. 2, Mar. 2006, 5 pages.

First Office Action for Chinese Patent Application No. 201880100089.5, mailed Sep. 25, 2023, 14 pages.

Reason for Rejection for Japanese Patent Application No. 2021535937, mailed Oct. 28, 2022, 4 pages.

* cited by examiner

METHOD FOR DETERMINING COORDINATES OF A VEHICLE

This application is a 35 USC 371 national phase filing of International Application No. PCT/EP2018/085575, filed Dec. 18, 2018, the disclosure of which is incorporated herein by reference in its entirety.

TECHNICAL FIELD

The present disclosure relates to a method for determining coordinates of a vehicle, specifically using a sensor arrangement arranged to acquire information in relation to an optical machine-readable tag mounted in a surrounding of the vehicle. The present disclosure also relates to a location determining arrangement and to a corresponding computer program product.

BACKGROUND

Recently there have been great advances in the semi or fully autonomous operation of a vehicle, effectively providing driver assistance and safety functions, such as adaptive cruise control, pedestrian detection, front and rear collision warning, lane departure warning and general obstacle detection. Such an autonomous vehicle typically makes use of a plurality of sensors that are configured to detect information about an environment surrounding the vehicle.

Generally, to ensure adequate navigation of such a semi or fully autonomous vehicle it is necessary to ensure that a current location of the vehicle is continuously known. Typically, the vehicle will include e.g. a satellite geolocation arrangement, such as a GPS receiver, for acquiring a current location of the vehicle. However, in some situations it may be problematic to receive signals from a plurality of satellites, such as in a mine without any satellite reception, and/or where the accuracy achievable using the satellite geolocation arrangement may be insufficient for the specific operation of the vehicle.

As an alternative, it may be possible to rely on local navigation means, for example by arranging objects at known locations (with known coordinates), where the location determination is performed by calculating how the vehicle relates to the object. An example of such a "local" method for determining coordinates of a vehicle is disclosed in US20030057270.

US20030057270 specifically relies on "identification devices" located at specific points on some form of structure, which a reading device arranged with the vehicle registers the devices when placed in proximity to the device. US20030057270 exemplifies the identification devices to comprise a barcode. The solution presented in US20030057270 adds some certainty to e.g. an address location, for purposes of commercial use in the nature of delivery or service calls, personal use, as in identifying locations of houses or structures in unfamiliar locations, or for emergency use, such as by police or firefighters.

Even if the solution in US20030057270 presents an interesting approach to local navigation means, it greatly lacks the accuracy needed for autonomous vehicle navigation. Accordingly, there appears to be room for further improvements in regards to local navigation means, adapted to provide a suitable level of accuracy for ensuring secure navigation of e.g. an autonomous vehicle.

SUMMARY

According to an aspect of the present disclosure, the above is at least partly alleviated by a computer implemented method for determining coordinates of a vehicle, the vehicle equipped with a location determining arrangement comprising a sensor arrangement and a control unit, the sensor arrangement provided at the vehicle with a predetermined relation to a vehicle reference position, wherein the method comprises the steps of determining, using the sensor arrangement and the control unit, at least one distance to an optical machine-readable tag, the optical machine-readable tag mounted in a surrounding of the vehicle at a fixed structure having a predetermined convex shape, determining, using the control unit, the shortest distance of the at least one distances to the optical machine-readable tag, determining, using the control unit, tag reference coordinates for the optical machine-readable tag based on an ID code associated with the optical machine-readable tag, and determining, using the control unit, the coordinates for the vehicle based on the tag reference coordinates, the shortest distance, the predetermined convex shape and the predetermined relation between the sensor arrangement and the vehicle reference position.

The present disclosure is based upon the realization that it may be possible to increase the reliability and accuracy of the coordinates of the vehicle, by also introducing a sensor arrangement that is capable of measuring distances to the optical machine-readable tag. The in comparison high accuracy is specifically achieved by also taking into account a known shape of the structure where the optical machine-readable tag. Accordingly, by combining a distance to the optical machine-readable tag as well as the known shape of the structure, it is possible to determine an overall distance to e.g. a center of the structure, where coordinates for the center of the structure have been previously determined.

As a result, a distance may be determined between the vehicle (typically for a vehicle reference position having a known relation to the sensor arrangement) and the center of the structure where the optical machine-readable tag has been arranged. As will be apparent from the above, the reliability/accuracy of the coordinates for the vehicle will be dependent on e.g. how well the sensor arrangement may determine the distance to the optical machine-readable tag, and how well the coordinates for the center of the structure has been previously determined.

As compared to e.g. prior-art solutions, in line with the present disclosure it may thus be possible to determine an essentially exact location for the vehicle. By further taking into account a determined relative angle between the sensor arrangement and the optical machine-readable code (for the shortest distance), it is in line with the present disclosure not necessary to e.g. triangulate the location of the vehicle, using a plurality of known coordinates as has been proposed according to general prior art. Rather, the concept according to the present disclosure relies on only a single optical machine-readable tag for determining the coordinates for the vehicle.

In a general implementation of the present disclosure, the sensor arrangement may be arranged to determine a plurality of distances to the optical machine-readable tag, where the shortest distance is then selected for use in further coordinate determination. However, the present disclosure should also be understood to be applicable where only a single distance is determined to the optical machine-readable tag.

The expression "convex shape", should in line with the present disclosure be interpreted broadly, meaning that any form or e.g. circular (with a predetermined radius), elliptical, angled, or otherwise "bulging" structure may be applicable, as long as the shape of the structure is known. As understood from the above, the sensor arrangement will typically read identifiable data (the ID code) associated with the optical machine-readable tag, where the ID code is in turn used for acquiring information about the shape of the structure and the previously determined coordinates for the optical machine-readable tag (and/or e.g. the center of the structure where the optical machine-readable tag is arranged).

It should be understood that the ID code in some embodiments may be acquired by scanning the optical machine-readable tag using the sensor arrangement, such as in an exemplary embodiment where the optical machine-readable tag is a barcode. However, it could in some alternative embodiment be possible to arrange the ID code separately from the optical machine-readable tag, where the ID code for example could be acquired using wireless means, such as Wi-Fi, NFC, etc.

"Look-up" of the tag reference coordinates for the optical machine-readable tag as well as the predetermined convex shape for the structure may be acquired form a database. The database may in some embodiment be arranged on-board the vehicle, e.g. arranged in direct communication with the control unit. However, in an alternative embodiment the database may be arranged remotely, such as at a sever arranged in networked communication with the control unit. In a still further alternative embodiment, the tag reference coordinates for the optical machine-readable tag as well as the predetermined convex shape for the structure may be acquired by "optically reading" information available at e.g. the vicinity of the optical machine-readable tag, e.g. using the sensor arrangement and/or other means, such as the wireless means discussed above.

Preferably, the method further comprises the steps of acquiring a compass direction for the vehicle in relation to the vehicle reference position, and determining a vehicle orientation, at the determined vehicle coordinates, based on the relative angle and the compass direction. Accordingly, by means of such an implementation also the overall orientation of the vehicle may be determined, such as outer edges of the vehicle (as long as such information is available).

The determined coordinates (as well as the overall orientation) may in some embodiment be related to e.g. a map of the surrounding of the vehicle. The map may in turn be used for visualizing the position of the vehicle in relation to e.g. other vehicles, structures, obstacles, road segments, etc., and for orientation/operation of the vehicle.

Having a full knowledge of the orientation and expansion/distribution of the vehicle is for example useful in case of operating the vehicle in narrow spaces (seen from e.g. a two-dimensional or a three-dimensional perspective), where limited "wiggling room" is available. Having such information available is also desirable in case of e.g. autonomous operation of the vehicle, i.e. in case the vehicle is an autonomous vehicle. It should be understood that the compass direction for the vehicle may be determined using e.g. a digital compass arranged at the vehicle and arranged in communication with the control unit.

It is worth noticing that the expression "autonomous vehicle", as used above, should be interpreted broadly and relates to a vehicle that is operated in a fully or partially autonomous mode. In a partially autonomous vehicle some functions can optionally be manually controlled (e.g. by a driver) some or all of the time. Further, a partially autonomous vehicle may be configured to switch between a fully-manual operation mode and a partially-autonomous and/or a fully-autonomous operation mode.

In a possible embodiment of the present disclosure the sensor arrangement comprises a pulsed laser, and the step of determining the plurality of distances comprises the steps of forming a point cloud comprising a plurality of measurement points, and estimating an appeared shape of the optical machine-readable tag. Accordingly, it could in some embodiment be possible to coordinate the knowledge of the optical machine-readable tag (arranged at the structure) as acquired using the ID code, with the estimated shape of the optical machine-readable tag. Such an operation may for example be used for determining the shortest distance to the optical machine-readable tag, as well as optionally for determining how the optical machine-readable tag is oriented in relation to the sensor arrangement.

The sensor arrangement may in some embodiments comprises a LiDAR system, specifically adapted for determining the at least one distance to the optical machine-readable tag, as well as possibly for acquiring the ID code. LiDAR systems have shown to be advantageous in some embodiments, due to its in comparison high update rate, which is suitable, specifically when the vehicle is continuously moving in relation to the optical machine-readable tag.

According to another aspect of the present disclosure there is provided a location determining arrangement for a vehicle, the location determining arrangement comprising a sensor arrangement and a control unit, the sensor arrangement provided at the vehicle with a predetermined relation to a vehicle reference position, wherein the location determining arrangement is adapted to determine, using the sensor arrangement and the control unit, at least one distance to an optical machine-readable tag, the optical machine-readable tag mounted in a surrounding of the vehicle at a fixed structure having a predetermined convex shape, determine, using the control unit, the shortest distance of the at least one distance to the optical machine-readable tag, determine, using the control unit, tag reference coordinates for the optical machine-readable tag based on an ID code associated with the optical machine-readable tag, and determine, using the control unit, the coordinates for the vehicle based on the tag reference coordinates, the shortest distance, the predetermined convex shape and the predetermined relation between the sensor arrangement and the vehicle reference position. This aspect of the present disclosure provides similar advantages as discussed above in relation to the previous aspect of the present disclosure.

The location determining arrangement is preferably provided as a component of a vehicle, where the vehicle for example is a working machine, such as an excavator, a wheel loader, a dozer, a grader and a backhoe loader. As mentioned above, the vehicle may in some embodiment be autonomously operated.

The location determining arrangement may also, or alternatively, be provided as a component of a location determining system, further comprising the above-mentioned optical machine-readable tag, wherein the optical machine-readable tag is mounted in a surrounding of the vehicle at a fixed structure having a predetermined convex shape. The fixed structure may for example be at least one of a pole and a stake.

In an embodiment, the optical machine-readable tag is provided as a repeating pattern. Such a repeating pattern may for example be arranged such that it appears the same independent on the direction of approach, meaning that the same pattern advantageously may be acquired independent on where the vehicle is located in relation to the optical machine-readable tag.

The control unit may in one embodiment be an electronic control unit (ECU) is typically provided as an onboard component of the vehicle, the vehicle for example being a bus, a truck a car, or any form of construction equipment.

The vehicle may furthermore be at least one of a pure electrical vehicle (PEV) and a hybrid electric vehicle (HEV).

According to a further aspect of the present disclosure there is provided a computer program product comprising a non-transitory computer readable medium having stored thereon computer program means for controlling a location determining arrangement for a vehicle, the location determining arrangement comprising a sensor arrangement and a control unit, the sensor arrangement provided at the vehicle with a predetermined relation to a vehicle reference position, wherein the computer program product comprises code for determining, using the sensor arrangement and the control unit, at least one distance to an optical machine-readable tag, the optical machine-readable tag mounted in a surrounding of the vehicle at a fixed structure having a predetermined convex shape, code for determining, using the control unit, the shortest distance of the at least one distances to the optical machine-readable tag, code for determining, using the control unit, tag reference coordinates for the optical machine-readable tag based on an ID code associated with the optical machine-readable tag, and code for determining, using the control unit, the coordinates for the vehicle based on the tag reference coordinates, the shortest distance, the predetermined convex shape and the predetermined relation between the sensor arrangement and the vehicle reference position. Also this aspect of the present disclosure provides similar advantages as discussed above in relation to the previous aspects of the present disclosure.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION OF EXAMPLE EMBODIMENTS OF THE INVENTION

Figure 1A:
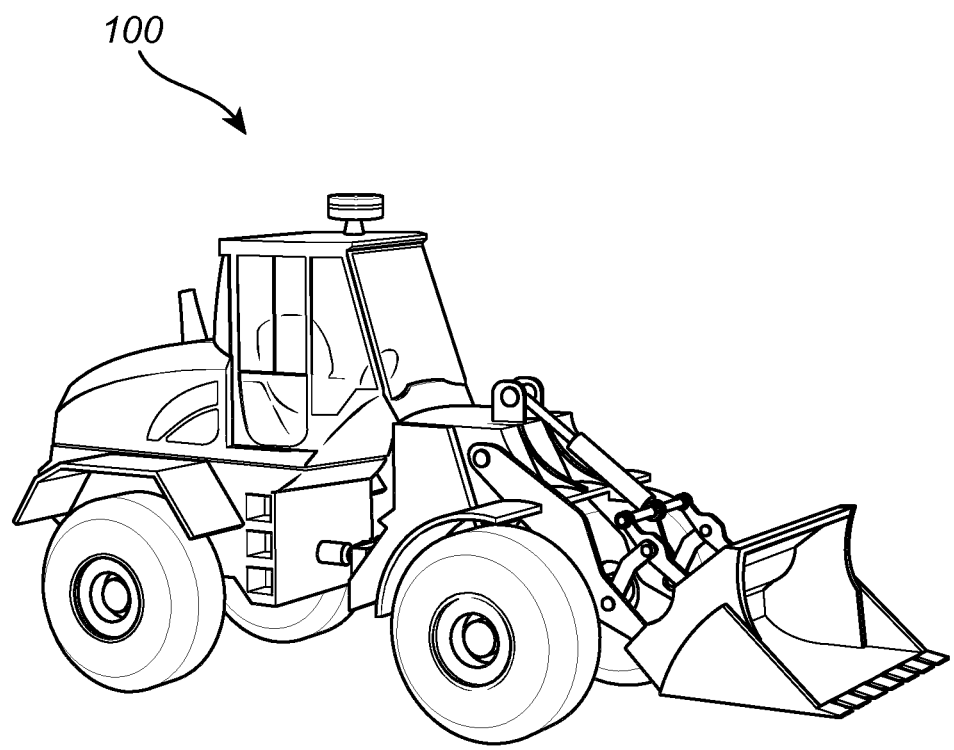
FIG. 1A illustrates a wheel loader and 1B a truck in which the location determining arrangement according to the present disclosure may be incorporated.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1B:
Figure 2:
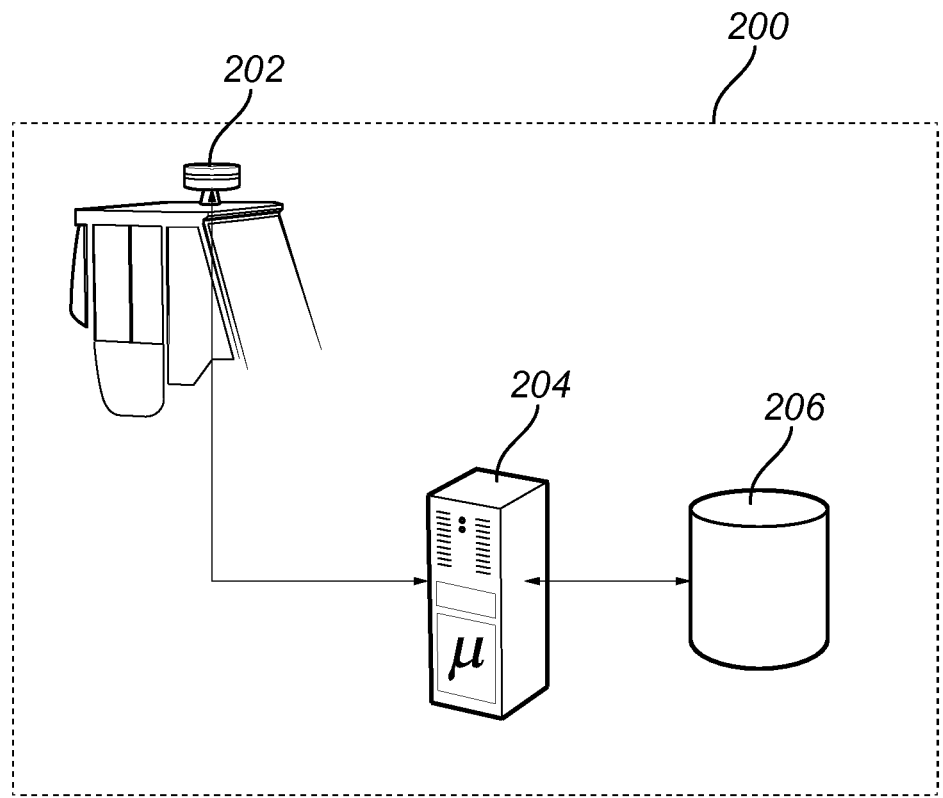
FIG. 2 illustrates a conceptual location determining arrangement in accordance to a currently preferred embodiment of the present disclosure.

Referring now to the drawings and to FIG. 1A in particular, there is depicted an exemplary vehicle, here illustrated as a wheel loader 100, in which a location determining arrangement 200 (as shown in FIG. 2) according to the present disclosure may be incorporated. The location determining arrangement 200 may of course be implemented, possibly in a slightly different way, in a truck 102 as shown in FIG. 1B, a car, a bus, etc.

The vehicle may for example be one of an electric or hybrid vehicle, or possibly a gas, gasoline or diesel vehicle. The vehicle comprises an electric machine (in case of being an electric or hybrid vehicle) or an engine (such as an internal combustion engine in case of being a gas, gasoline or diesel vehicle). The vehicle may further be manually operated, fully or semi-autonomous.

FIG. 2 shows a conceptual and exemplary implementation of the location determining arrangement 200, comprising a control unit 204, such as an electronic control unit (ECU), for determining coordinates of e.g. any one of the vehicles 100, 102. The ECU 204 implements an interface for receiving data from a sensor arrangement 202, in FIG. 2 implemented as a LiDAR arrangement (as mentioned above), where the operation of a LiDAR is well known to the person skilled in the art. Such a LiDAR arrangement may for example be arranged at a roof portion of the vehicle 100, 102.

The location determining arrangement 200 of FIG. 2 further comprises a database 206, where the database 206 may be locally arranged (such as with the vehicle 100, 102), or remotely such as with a remotely arranged server arranged in a networked communication with the control unit 204.

For reference, the control unit 204 may for example be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Figure 3:
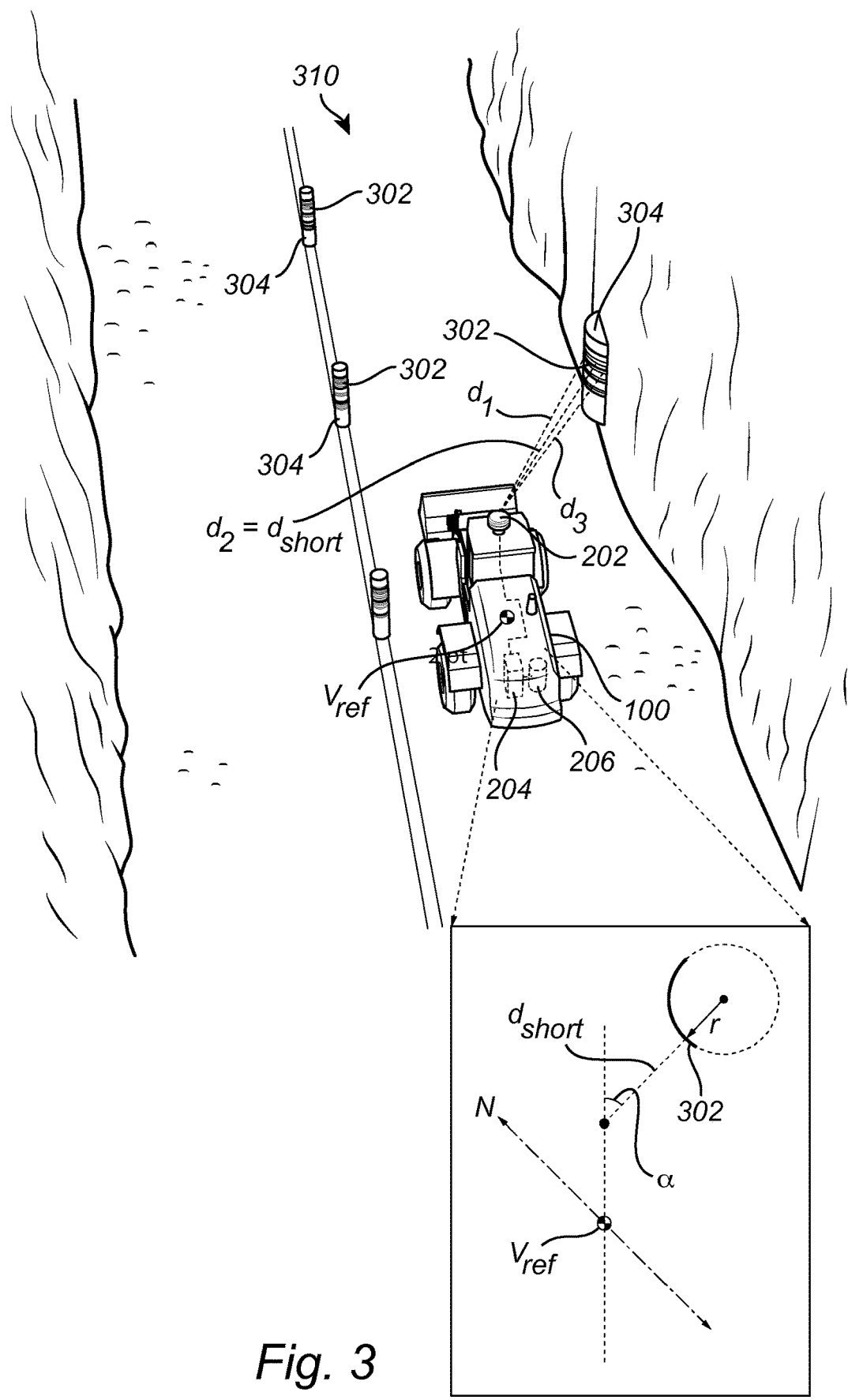
FIG. 3 is an exemplary illustration of an operational environment for the vehicle of FIG. 1A, where the vehicle acquires data from a plurality of optical machine-readable tag mounted on poles in a surrounding of the vehicle.

With further reference to FIG. 3, as indicated above the location determining arrangement 200 is preferably arranged as a component of the vehicle, such as the wheel loader 100. In FIG. 3, the location determining arrangement 200 is arranged at an elevated portion of the wheel loader 100, such as at a roof portion of the wheel loader 100.

The wheel loader 100 is in FIG. 3 travelling along a path 310, such as along a road section within a mine. As mentioned above, within a mine there may in some situation be none or very limited possibility to rely on e.g. a global positioning system (GPS), due to the fact that satellite signal will not reach below ground and into the mine. Along the path 310 there are arranged a plurality of structures 304, each provided with an optical machine-readable tag 302, here provided as barcodes (being individual for each of the structures 304). The barcodes in FIG. 3 are arranged with the lines in a horizontal direction, resulting in that information comprised with the barcode may be acquired (optically read) using the sensor arrangement 202, independent on in which direction the wheel loader 100 is approaching the structures 304 with the optical machine-readable tag 302.

In FIG. 3 there are shown two types of structures 304, where on a left hand side of the wheel loader 100 the structures are poles (arranged between two lanes of the path 310), whereas on the right hand side the structure 304 is a "bulging surface" arranged at e.g. a wall of the mine. Furthermore, based on the use of a barcode as the optical machine-readable tag 302, it is in line with the present disclosure possible to include an individual ID code, embedded with the barcode. As shown in FIG. 3, the wheel loader 100 is provided with a vehicle reference position $V_{ref}$, where the vehicle reference position $V_{ref}$ is defined as a set position at the vehicle having a predetermined relation to the sensor arrangement 202.

In line with the present disclosure, coordinates for the different structures 304 have been (as exactly as possible) determined at a previous point in time. The coordinates for each of the structures 304 have then been stored in e.g. the database 206 in association with the ID code for the specific structure 304.

Figure 4:
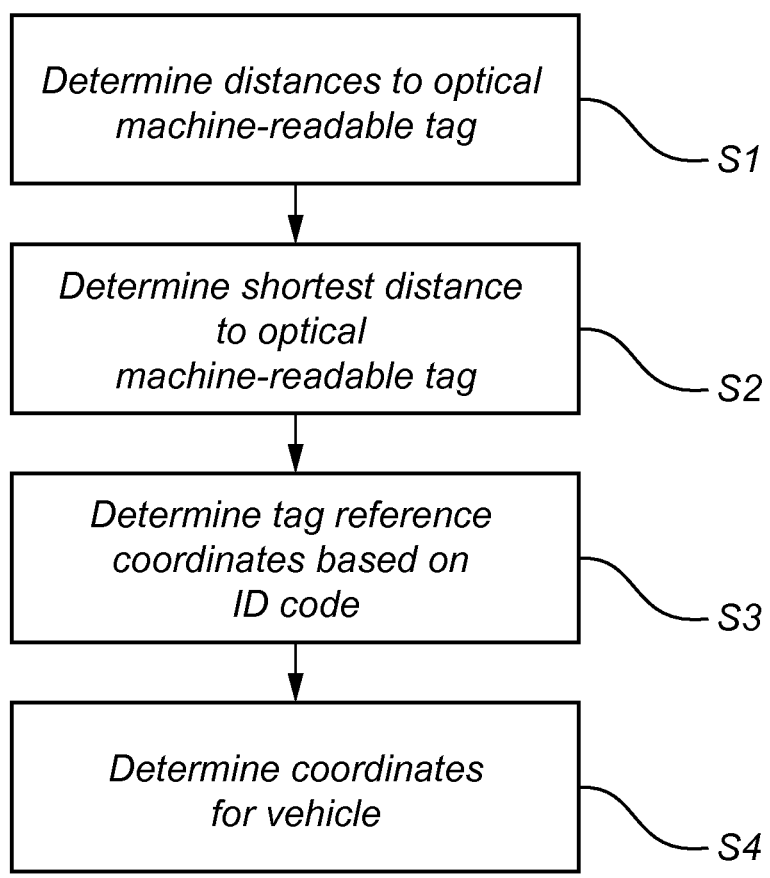
FIG. 4 illustrates the processing steps for performing the method according to the present disclosure.

Accordingly, during operation of the wheel loader 100, with reference also to FIG. 4, the wheel loader 100 will approach one of the structures 304 and using the sensor arrangement 202 and the control unit 204 identify the presence of the optical machine-readable tag 302. The sensor arrangement 202 and the control unit 204 then determines, S1, at least one distance ($d_1, d_2, \ldots, d_n$) to the optical machine-readable tag 302. In the illustration provided in FIG. 3, three distances are determined ($d_1, d_2$ and $d_3$). It should however be understood that more than three distances may be determined, as well as in some situations only a single distance.

The control unit 304 then determines, S2, which of the distances is the shortest distance, and in the exemplary illustration as shown in FIG. 3 the distance $d_2$ is determined to be the shortest distance, $d_{short}$. The control unit 204 then determines, S3, tag reference coordinates for the optical machine-readable tag 302 based on an ID code associated with the optical machine-readable tag 302. In line with the illustration provided in FIG. 3, this is implemented by acquiring an individual ID code embedded with the barcode arranged at the structure 304. The control unit 204 then provides the individual ID code to the database 206, and in return receives the tag reference coordinates for the optical machine-readable tag 302 arranged at the structure 304, as well as a shape of the specific structure 304.

With the tag reference coordinates for the specific structure 304 at hand, in combination with the shortest distance $d_{short}$ and the information about the shape of the structure 304, the control unit 204 may determine, S4, the coordinates for the wheel loader 100. That is, there is by means of the present disclosure possible to form a relation between the vehicle reference position $V_{ref}$ and a known position associated with the specific structure 304, where the known position for the specific structure 304 preferably is a center point if the specific structure 304 is formed to have an at least partly circular shape.

The relation between the vehicle reference position $V_{ref}$ and a known position at the specific structure 304 preferably take into account not only the shortest distance between the sensor arrangement 202 and the optical machine-readable tag 302, but also a relative angle α between the two. The combination of (optionally) the relative angle α and the known radius (since the of the shape of the structure 304 is known) may then used for calculating how the known position of the structure 304 is related to the vehicle reference position $V_{ref}$, as is further illustrated in FIG. 3, thereby relating the known position (coordinates) of the specific structure 304 to the vehicle reference position $V_{ref}$.

It may in some embodiment be desirable to make use of the coordinates of the vehicle reference position $V_{ref}$ for the wheel loader 100 to also determine the complete orientation of the wheel loader 100. As is exemplified in FIG. 3 it may be possible to also take into account a compass direction for the wheel loader 100 in relation to the vehicle reference position $V_{ref}$, and relate the compass direction of the wheel loader 100 with the relative angle α between the sensor arrangement 202 and the optical machine-readable tag 302 for the shortest distance $d_{short}$. Accordingly, using such an implementation it may be possible to determine coordinates for any position at the wheel loader 100 (as related to the vehicle reference position $V_{ref}$.

The determined coordinates as well as the orientation of the wheel loader 100 may subsequently be used for navigation of the wheel loader 100. Using the exemplified LiDAR arrangement as the sensor arrangement 202, it may in line with the present disclosure be possible to at an in comparison high speed continuously determine the location of the wheel loader 100. For example, in some embodiments the LiDAR arrangement may sample up to 1.5 million data points per second. In a possible embodiment, the LiDAR arrangement may be provided as a rotating arrangement at the roof of the wheel loader 100, where the rotational speed is between 5-20 Hz, meaning that the same position may be scanned every $1/5^{th}$-$1/20^{th}$ second. Accordingly, the update rate for the coordinates for the vehicle 100, 102 in relation to a specific optical machine-readable tag 302/structure 304 be as high as 5-20 times per second.

In summary, the present disclosure relates to a method for determining coordinates of a vehicle 100, specifically using a sensor arrangement 202 arranged to acquire information in relation to an optical machine-readable tag 302 mounted in a surrounding of the vehicle 100. The present disclosure also relates to a location determining arrangement 200 and to a corresponding computer program product.

In line with the present disclosure, by means of combining a distance to the optical machine-readable tag as well as the known shape of the structure, it is possible to determine an overall distance to e.g. a center of the structure, where coordinates for the center of the structure have been previously determined.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for determining coordinates of a vehicle, the vehicle equipped with a LiDAR system and an electronic control unit (ECU), the LiDAR system provided at the vehicle with a predetermined relation to a vehicle reference position, the method comprising:
   determining, using the ECU based on LiDAR data from the LiDAR system, a plurality of distances to an optical machine-readable tag, the optical machine-readable tag mounted in a surrounding of the vehicle at a fixed structure having a predetermined convex shape with a radius known by the ECU,
   determining, using the ECU, the shortest distance among the plurality of distances to the optical machine-readable tag,
   determining, using the ECU, tag reference coordinates for the optical machine-readable tag based on an ID code associated with the optical machine-readable tag,
   determining, using the ECU, the coordinates for the vehicle based on the tag reference coordinates, the shortest distance, the known radius of the predetermined convex shape, and the predetermined relation between the LiDAR system and the vehicle reference position, and
   controlling, using the ECU, operation of the vehicle based on the determined vehicle coordinates.

2. The method of claim 1, further comprising:
   acquiring the ID code by scanning the optical machine-readable tag using the LiDAR system.

3. The method of claim 1, further comprising:
   determining, using the ECU, a relative angle between the LIDAR system and the optical machine-readable tag for the shortest distance,
   acquiring a compass direction for the vehicle in relation to the vehicle reference position, and
   determining a vehicle orientation, at the determined vehicle coordinates, based on the relative angle and the compass direction.

4. The method of claim 1, wherein determining the plurality of distances comprises:
   forming a point cloud comprising a plurality of measurement points, and
   estimating an appeared shape of the optical machine-readable tag.

5. The method of claim 1, wherein the predetermined convex shape of the fixed structure is circular.

6. The method of claim 1, wherein determining the tag reference coordinates for the optical machine-readable tag comprises acquiring information relating to geographical coordinates for the optical machine-readable tag and information relating to the predetermined convex shape for the fixed structure.

7. The method of claim 6, further comprising:
   acquiring the geographical coordinates for the optical machine-readable tag and the information relating to the predetermined convex shape for the fixed structure from a database.

8. The method of claim 7, wherein the database is located onboard the vehicle.

9. The method of claim 7, wherein the database is located remotely from the vehicle.

10. The method of claim 1, further comprising:
    relating the determined vehicle coordinates to a map of the surrounding of the vehicle.

11. A system for a vehicle, comprising:
    a LiDAR system; and
    an electronic control unit (ECU), the LiDAR system provided at the vehicle with a predetermined relation to a vehicle reference position, wherein the ECU is adapted to:
    determine, based on LiDAR data from the LiDAR system, a plurality of distances to an optical machine-readable tag, the optical machine-readable tag mounted in a surrounding of the vehicle at a fixed structure having a predetermined convex shape with a radius known by the ECU,
    determine the shortest distance among the plurality of distances to the optical machine-readable tag,
    determine tag reference coordinates for the optical machine-readable tag based on an ID code associated with the optical machine-readable tag,
    determine coordinates for the vehicle based on the tag reference coordinates, the shortest distance, the known radius of the predetermined convex shape and the predetermined relation between the LiDAR system and the vehicle reference position, and
    control operation of the vehicle based on the determined vehicle coordinates.

12. The system of claim 11, wherein the ECU is further adapted to acquire the ID code by scanning the optical machine-readable tag using the LiDAR system.

13. The system of claim 11, wherein the ECU is further adapted to:
- determine a relative angle between the LiDAR system and the optical machine-readable tag for the shortest distance,
- acquire a compass direction for the vehicle in relation to the vehicle reference position, and
- determine an orientation of the vehicle, at the determined vehicle coordinates, based on the relative angle and the compass direction.

14. The system of claim 11, wherein the ECU is further adapted to relate the determined vehicle coordinates to a map of the surrounding of the vehicle.

15. The system of claim 14, wherein the ECU is further adapted to present the map at a user interface of the vehicle.

* * * * *